Dec. 25, 1962     L. D. HENRY     3,069,904
MEANS FOR SENSING ROUGHNESS OF A ROADWAY SURFACE
Filed Feb. 1, 1960     3 Sheets-Sheet 1

Inventor
Lyell D. Henry
by M. Talbert Dick
Attorney

Dec. 25, 1962 L. D. HENRY 3,069,904
MEANS FOR SENSING ROUGHNESS OF A ROADWAY SURFACE
Filed Feb. 1, 1960 3 Sheets-Sheet 2
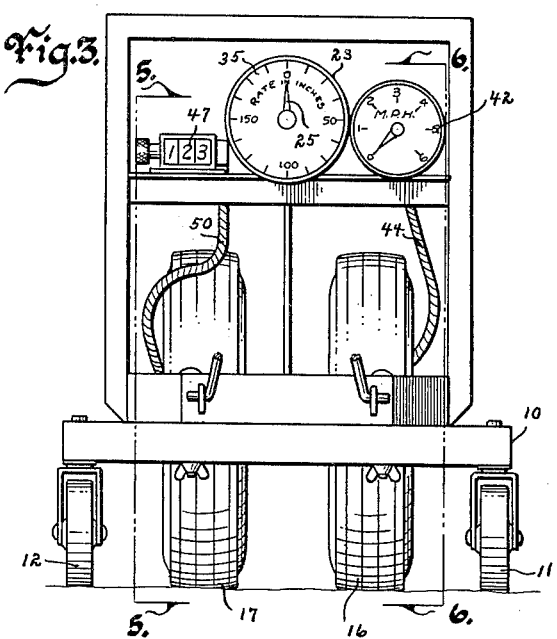
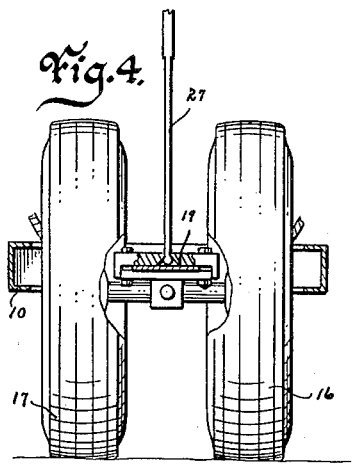
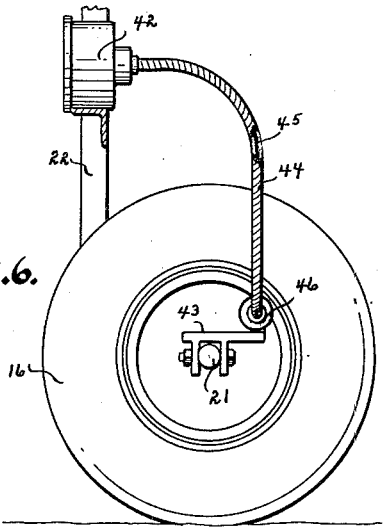
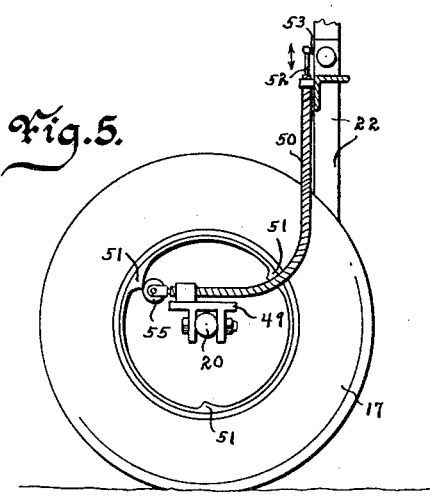
Inventor
Lyell D. Henry
by M. Talbert Dick
Attorney
Witness
Edward P. Seeley Dec. 25, 1962 L. D. HENRY 3,069,904
MEANS FOR SENSING ROUGHNESS OF A ROADWAY SURFACE
Filed Feb. 1, 1960 3 Sheets-Sheet 3
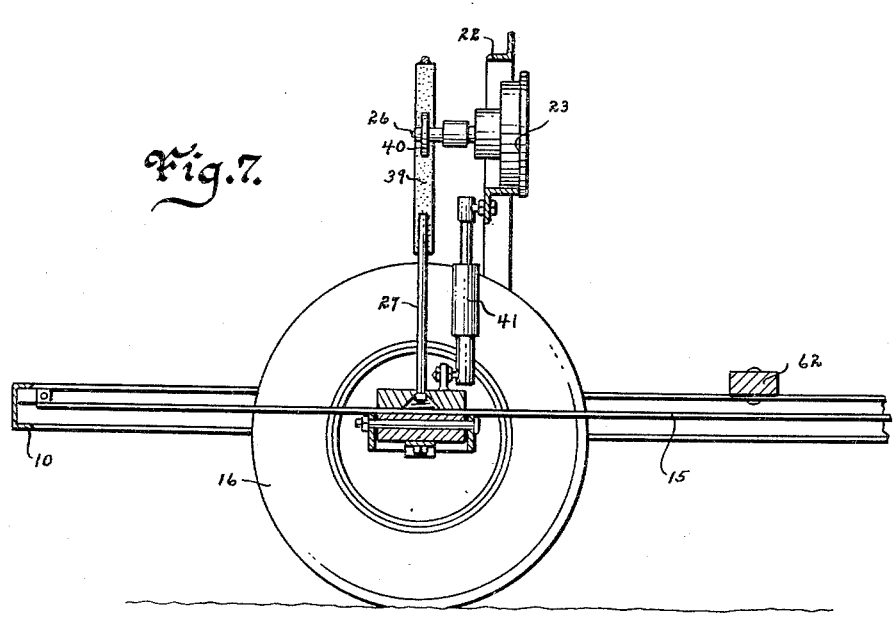
Fig. 7.
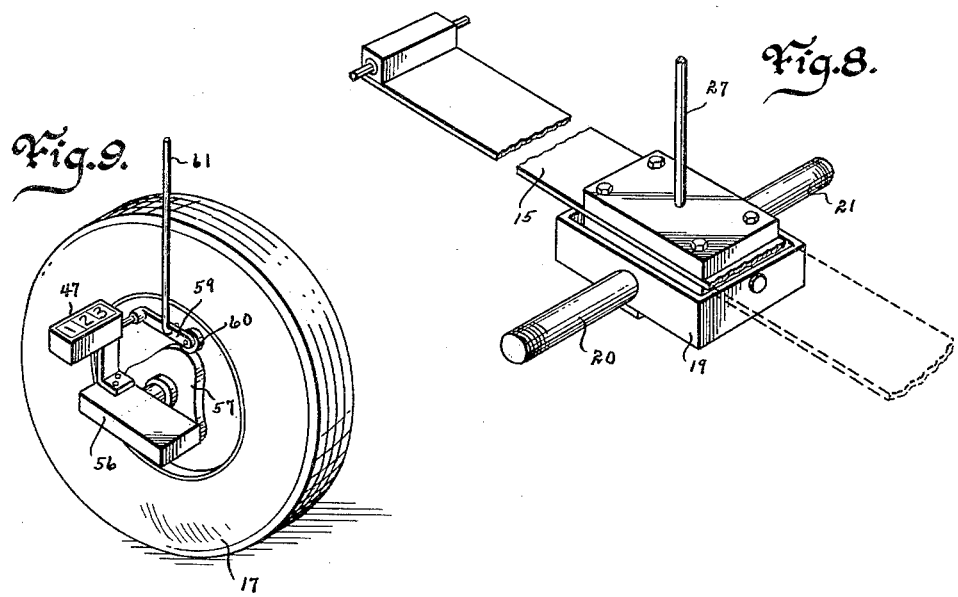
Fig. 9.
Fig. 8.
Witness
Edward P. Seeley
Inventor
Lyell D. Henry
by M. Talbert Dick
Attorney United States Patent Office 3,069,904
Patented Dec. 25, 1962

3,069,904
MEANS FOR SENSING ROUGHNESS OF A
ROADWAY SURFACE
Lyell D. Henry, 2234 Knapp St., Ames, Iowa
Filed Feb. 1, 1960, Ser. No. 5,814
2 Claims. (Cl. 73—146)

This invention is an improvement of my Patent No. 2,946,644 on a Method of and Means for Sensing and Tabulating the Accumulated Roughness of a Roadway Surface, issued on July 26, 1960 and relates to the means for sensing the roughness of a surface and more particularly to a lightweight portable device capable of indicating the roughness of a vehicle roadway or like.

One of the most difficult tasks is to determine the surface condition of concrete or black top roads. Obviously, if a roadway has a surface that is rougher than standard, the road is objectionable both from a shortened useful life and possible damage to the vehicles moving over the roadway. Furthermore, a rough road surface is most uncomfortable to the passengers of the vehicle and in many instances the roughness of the road surface has caused the vehicle to go out of control and result in both loss of life and property damage.

The measurement of roads on a relative basis has resulted in the establishment of a code roughness index at a certain set of specified constants. The roughness index normally is in terms of inches per mile. The measurement is always only in one direction, i.e., only up or only down. Thus, the accumulated inches made up of small increments and even larger jumps, while ignoring the reverse down strokes, will over a given distance give the roughness index for that distance. In general, it has been established that in one mile the number of inches of roughness for black top roads should not be over sixty inches and not over ninety inches for Portland cement roads.

Attempts have been made heretofore to measure the roughness of road surfaces. Such machines are most large and expensive and must be power-moved down the highway. Any machine, however, for measuring roughness and tabulating it must use the system of "Center of percussion" i.e., the upwardly or downwardly movement of a feeler wheel relative to the chassis upon which the wheel is mounted for such up and down reactions. This principle may be demonstrated by placing a pencil and snapping one end with one's finger thereby causing the pencil to spin. It will be noted that the axis of rotation will be approximately at the two-thirds point. If the pencil is snapped at the two-thirds point the pencil will rotate about its far end. Therefore this phenomenon can be shown by formula and in such testing machines effort has been made in general to place two-thirds of the distance and the mass between the sensing wheel and the chassis hitch. Any machine will vary with the speed of movement of the machine, the tire pressure, the strength of the springs, etc. Nevertheless, if a set of constants is chosen for these variables, the ups and downs of the sensing wheel relative to the frame may be measured and recorded and interpreted. One of the objections to the large complicated machines herebefore referred to is that due to their weight, they cannot be drawn down a newly laid roadway that has not yet completely hardened and solidified. Obviously, it is highly desirable to check the roadway as soon as possible and before the same has completely hardened. These large machines herebefore have been objectionably complicated and especially as to the mechanism of their integrator which sums up the amount of roughness. These integrators usually consist of sixteen ball bearings operating in sloping racks. Some effort has been made to produce an electronic counter but the electric contact on the tripping cam and which is designated as one inch, may start at the extreme measurement thereof and thus would be off one inch as registered at the start. This is one of the reasons that large machines are not efficient for measuring short distances of highway and in most instances it is highly necessary to obtain data on such short distances.

While the device presented in my previously referred to application overcame many of the above objections, it did have certain shortcomings. Because of the use of two springs in the previous machine there were certain conditions when the springs would not necessarily move together or in phase. Obviously, measurement of one spring would be influenced by a small amount of unavoidable wobble of the machine and measurement therefore at a point between the two springs would be objectionably influenced by a small amount of uneven phase of the two spring movements. Another objection was the disadvantage in total weight or portability, with reference to the measurement of the movement of two springs inasmuch as the load, for a given stability of the frame and the deflection of the springs would result in less frame stability for a given weight. Also in my previous machine some accuracy was lost due to the employment of tooth gears, rewinding drums, elongated cables and like. Furthermore, my previous machine was relatively costly to manufacture and critical in adjustment.

Therefore one of the principal objects of my invention is to provide a machine for indicating the roughness of a road surface that is economical in manufacture and use.

A further object of my invention is to provide a portable lightweight machine for gauging roadway roughness that has a single centrally located leaf spring for sensing the roughness of the surface.

A still further object of my invention is to provide a machine for indicating the roughness of a road surface that has no lost gear or like looseness between its sensing mechanism and its integrator.

A still further object of this invention is to provide a portable lightweight machine that may be used over a road surface that has just recently been laid and before the same has completely hardened.

A still further object of this invention is to provide a machine that permits the starting and stopping of the machine with most accurate measurements.

Still further objects of my invention are to provide a surface sensing machine that is easily operated and durable.

These and other objects will be apparent to those skilled in the art.

My invention consists in the construction, arrangements, and combination of the various parts of the device, whereby the objects contemplated are attained as hereinafter more fully set forth, specifically pointed out in my claims, and illustrated in the accompanying drawings, in which:

FIG. 3 is a rear end view of my machine and more fully illustrates its construction;

FIG. 4 is a cross-sectional view of the device taken on line 4—4 of FIG. 2;

FIG. 5 is a side sectional view of the apparatus taken on line 5—5 of FIG. 3;

FIG. 6 is a different side sectional view of the apparatus taken on line 6—6 of FIG. 3;

FIG. 7 is a side sectional view of a modified form of structure of connecting the sensing unit with the integrator;

FIG. 8 is a perspective view of my single sensing leaf spring illustrating one method of securing the sensing wheels thereto; and FIG. 9 is a perspective view of the wheel revolution counter that may, if desired, be used.

Figure 1:
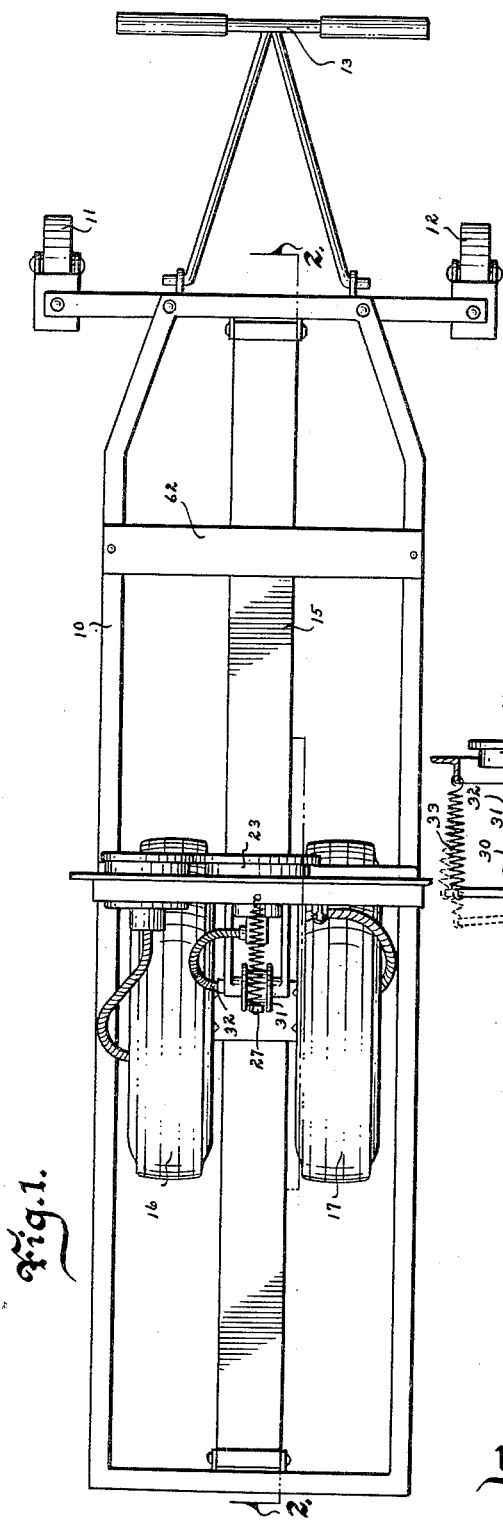
FIG. 1 is a top plan view of my complete machine ready for use.

In these drawings I have used the numeral 10 to designate a substantially rectangular elongated chassis frame. On the rear end of this frame 10 I support the same by two relatively small caster wheels 11 and 12, spaced apart substantially wider than the frame. This rear end of the device is the hitch end and I have secured thereto a handle member 13 to facilitate the manual movement of the device over the roadway. The numeral 15 designates an elongated single flat leaf spring within the frame, extending longitudinally of the frame and having one end operatively hingedly secured to the rear center of the frame and its other end operatively hingedly secured to the forward center of the frame. By this construction the flat leaf spring 15 will extend in a central longitudinal plane of the frame chassis as shown in FIG. 1. Near the forward one-third length of the leaf spring I rotatably secure to the leaf spring the two sensing wheels 16 and 17. These two wheels are at each side of the leaf spring, respectively, and preferably are pneumatic tired as shown. Any suitable means may be used to rotatably secure the wheels to the leaf spring. I show a bearing block 19 bolted to the leaf spring and which has the two wheel axles 20 and 21 extending laterally from the leaf spring and away from each other as shown in FIG. 8. The two wheels 16 and 17 are rotatably mounted on these two horizontal axles, respectively. The numeral 22 designates an inverted U-frame secured to the two sides of the frame 10, and which is positioned to the rear of the sensing wheels. This U-frame extends to a height substantially above that of the sensing wheels. The numeral 23 designates a sensing integrator secured to the U-frame having its face extending rearwardly in order that its dial hand 25 will be observable by the operator. Any suitable means may be used to operatively connect the instrument's actuating shaft 26 to the leaf spring 15.

In the drawings I show two systems. In FIGS. 1 to 4 I pivot the lower end of a post 27 to the base 19. This post extends upwardly and forward of the U-frame 22. The numeral 29 designates a bracket on the U-frame and which rotatably supports a small shaft 30. The numeral 31 designates a flanged rim wheel secured on the shaft 30. The shaft 30 is connected to the shaft of the integrator by an ordinary encased flexible shaft 32 as shown in FIG. 1. The upper end portion of the post 27 is adapted to engage the center peripheral area of the wheel 31. A spring 33, has one end connected to the U-frame and its other end secured to the upper end of the post for yieldingly holding the post in frictional contact with the wheel. If desired, the periphery of the wheel and the post may be roughened to provide better frictional contact. Obviously, when the post is vertically reciprocated the integrator shaft will be rotated and the hand will show the rate of roughness of a given surface length in inches. This reciprocating of the post 27 will be caused by the up and down movement of the leaf spring 15, caused by the wheels 16 and 17 moving over an uneven surface such as that of a roadway. The dial hand moves clockwise over the instrument dial 35 which is for one hundred feet calibrated at the rate in inches per mile. The integrator hand 23 only moves in a clockwise direction and this movement is intermittent in that the hand is only moved when the wheel post moves upwardly relative to the frame 10. If the hand 25 were to intermittently move to total one complete revolution over the dial 35, four inches of roughness of the surface would be indicated.

Figure 2:
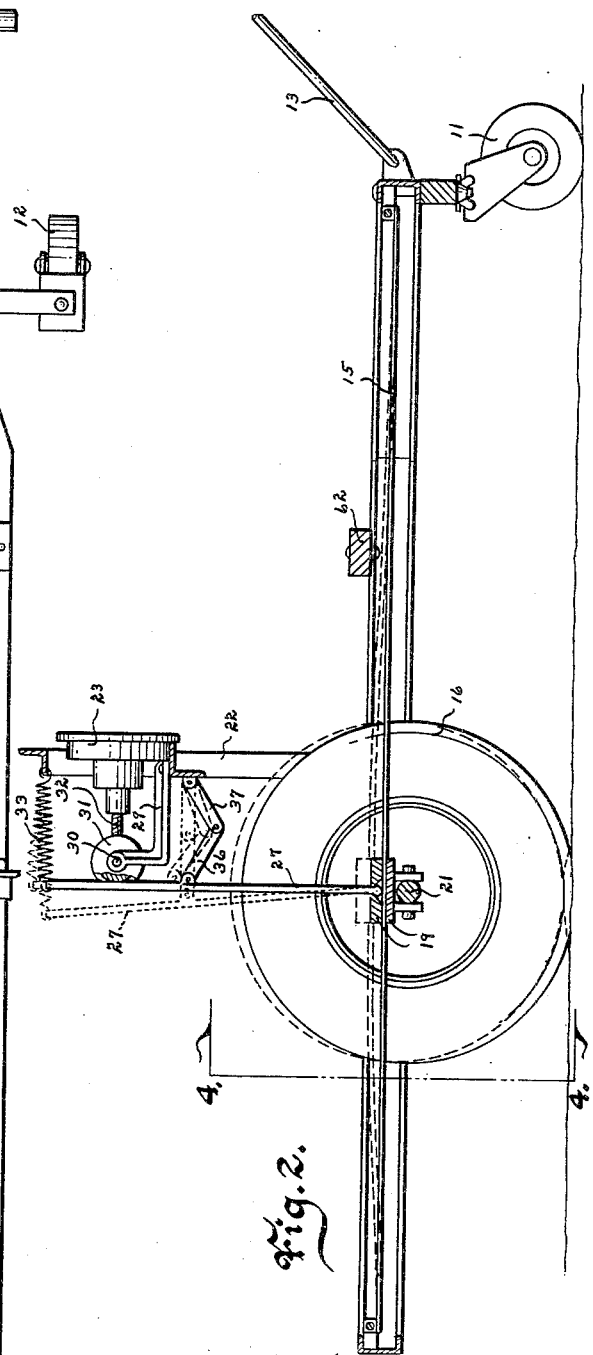
FIG. 2 is a longitudinal sectional side view of my device taken on line 2—2 of FIG. 1.

The numeral 36 designates a link having one end hinged to the post 27. The numeral 37 designates a second link having one end hinged to the other end of the link 36 and its other end hinged to the U-frame 22. By moving these links into a horizontal plane as shown by broken lines in FIG. 2, the post 27 will be held out of contact with the wheel 31. To place the device into operation the two links are hingedly moved downwardly as shown in FIG. 2. In FIG. 7, I show a different style of operatively connecting the post 27 to the integrator shaft. The upper end of the post is in the form of a side roughened bar 39. On the integrator shaft 26. I mount a wheel 40 which is in direct contact with the roughened side of the bar 39. Any suitable releasable spring means may be used for holding the bar 39 toward the wheel 40. To prevent undesirable wheel 16 and 17, bounce, I use an ordinary shock absorber 41 or like, having one end secured to the bearing block 19 and its other end secured to the U-frame 22. The numeral 42 designates a speedometer on the U-frame 22, calibrated in miles per hour. On the axle 21 is a bracket bearing 43 supporting one end of a flexible speedometer shaft and tube 44. The other end of the tube is secured to the speedometer. The shaft 45, which is connected in the usual way to the speedometer, has its lower end secured to a roller wheel 46 and which is in contact with the wheel rim of the wheel 16 as shown in FIG. 6. The numeral 47 designates an accumulated distance meter. In FIG. 3 I show this meter mounted on the U-frame 22. The numeral 49 designates a bracket on the axle 20. The numeral 50 designates a flexible tube having one end secured to the bracket 49 and its other end secured to the U-frame 22. On the rim of the wheel 17 I have spaced apart cam lugs 51. The numeral 52 designates a flexible rod slidably extending through the flexible tube 50 having one end connected to the counter meter arm 53. On the other end of the rod is a roller wheel 55 in engagement with the wheel rim having the cam lugs 51. By this arrangement whenever the roller wheel passed over a cam lug, the counter arm would be raised. In FIG. 9, I show a different structure. The distance counter meter 47 is mounted directly onto a bracket 56 which is in turn secured to the axle 20. A cam 57 is secured to the side of the wheel 17. The counter arm of the meter has a crank arm 59 which carries a roller wheel 60. This wheel 60 is in rolling contact with the cam 57. A rod handle 61 is secured to the crank arm for raising the crank arm away from an operative contact position with the cam 57.

Obviously, the speed with which the device moves over the roadway surface will affect the readings. The purpose, therefore, of the speedometer 42 is for the maintenance of a given speed. If my device is manually pushed over the roadway, I recommend that a speed of approximately three miles per hour be maintained. Once the factors have been established the device is most accurate in the measurement, recording and tabulation of the roughness of a roadway including its accumulated amount of roughness over a given distance. Herebefore in larger type machines, constant speed, tire pressure and the like were important factors but with my device one of the most important phases is the balancing of the entire unit so that it would be sensitive to road roughness. To get the proper results and take advantage of the phenomenon herebefore discussed, it is necessary that the hitch end of the unit be substantially spaced from the wheel axle. A weight 62 may be placed on the frame 10 between the sensing wheels and wheels 11 and 12.

With the various instruments neutralized and after the desired travel speed has been obtained, the controls are moved to effective positions.

The integrator will register the accumulated roughness. The distance tabulator 47 will record the distance over which the device has operated, and the speedometer will indicate the speed of travel.

Some changes may be made in the construction and arrangement of my means for sensing roughness of a roadway surface without departing from the real spirit and purpose of my invention, and it is my intention to cover by my claims, any modified forms of structure or use of mechanical equivalents which may be reasonably included within their scope.

I claim:
1. A device for indicating the roughness of a road surface comprising in combination:
an elongated substantially rectangular frame;
a pair of transversely spaced wheels supporting said frame at one end thereof;
thin narrow elongated steel spring means suspended from one end of said frame to the other and extended along the longitudnial axis of said frame;
another pair of transversely spaced pneumatic-tired wheels mounted within said frame and having an axle therebetween;
a block member securely mounted at the midpoint of said axle and connected to said spring means at a location thereon approximately two-thirds the length thereof as measured from the end of said spring means adjacent said frame supporting wheels;
an upstanding post one end of which is freely pivotally mounted on said block member;
bracket means mounted on said frame adjacent said post and having a sensing integrator mounted thereon;
a roller mounted on said bracket means and operatively connected to said integrator; and
means interconnected between said post and said bracket means for laterally biasing said post into frictional engagement with said roller.

2. A device for indicating the roughneses of a road surface comprising in combination:
an elongated substantially rectangular frame;
a pair of transversely spaced wheels supporting said frame at one end thereof;
a thin, narrow, elongated piece of steel spring suspended from one end of said frame to the other and extended along the longitudinal axis of said frame;
another pair of transversely spaced pneumatic-tired wheels mounted within said frame and having an axle therebetween;
a block member securely mounted at the midpoint of said axle and connected to said spring at a location thereon approximately two-thirds the length thereof as measured from the end of said spring adjacent said frame supporting wheels;
an upstanding post one end of which is freely pivotally mounted on said block member;
bracket means mounted on said frame adjacent said post and having a sensing integrator mounted thereon;
a roller mounted on said bracket means and operatively connected to said integrator; and
means interconnected between said post and said bracket means for laterally biasing said post into frictional engagement with said roller.

References Cited in the file of this patent
UNITED STATES PATENTS

| | | |
|---|---|---|
| 1,042,525 | Benoist | Oct. 29, 1912 |
| 1,264,495 | Dunbar | Apr. 30, 1918 |
| 1,401,913 | Lorraine | Dec. 27, 1921 |
| 1,590,313 | Powell | June 29, 1926 |
| 1,788,871 | Helgeby | Jan. 13, 1931 |
| 2,946,644 | Henry | July 26, 1960 |